US011981877B2

(12) United States Patent
Schweißinger et al.

(10) Patent No.: US 11,981,877 B2
(45) Date of Patent: May 14, 2024

(54) ACRYLATE-OLEFIN COPOLYMERS AS HIGH VISCOSITY BASE FLUIDS

(71) Applicant: Evonik Operations GmbH, Essen (DE)

(72) Inventors: Emily Clare Schweißinger, Dortmund (DE); Stefan Karl Maier, Ober-Ramstadt (DE); Katja Nothdurft, Haltern am See (DE); Yvonne Groß-Onnebrink, Raesfeld (DE); Dieter Janßen, Gross-Umstadt (DE); Holger Pletsch, Frankfurt (DE); Stefan Hilf, Zwingenberg (DE); Denise Kleinschmidt, Duesseldorf (DE); Sebastian Babik, Duesseldorf (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/200,043

(22) Filed: May 22, 2023

(65) Prior Publication Data

US 2023/0383212 A1 Nov. 30, 2023

(30) Foreign Application Priority Data

May 24, 2022 (EP) .................................... 22174980

(51) Int. Cl.
| | | |
|---|---|---|
| *C10M 145/14* | (2006.01) | |
| *C08F 220/18* | (2006.01) | |
| *C10M 169/04* | (2006.01) | |
| C10N 20/02 | (2006.01) | |
| C10N 20/04 | (2006.01) | |
| C10N 40/04 | (2006.01) | |
| C10N 40/08 | (2006.01) | |
| C10N 40/25 | (2006.01) | |
| C10N 50/10 | (2006.01) | |

(52) U.S. Cl.
CPC ..... *C10M 145/14* (2013.01); *C08F 220/1808* (2020.02); *C08F 220/1809* (2020.02); *C10M 169/041* (2013.01); *C08F 2800/20* (2013.01); *C10M 2203/003* (2013.01); *C10M 2209/084* (2013.01); *C10N 2020/02* (2013.01); *C10N 2020/04* (2013.01); *C10N 2040/04* (2013.01); *C10N 2040/08* (2013.01); *C10N 2040/25* (2013.01); *C10N 2050/10* (2013.01)

(58) Field of Classification Search
CPC ............ C10M 145/14; C10M 169/041; C10M 2203/003; C10M 2209/084; C08F 220/1808; C08F 220/1809; C08F 2800/20; C10N 2020/02; C10N 2020/04; C10N 2040/04; C10N 2040/08; C10N 2040/25; C10N 2050/10
USPC .......................................................... 508/506
See application file for complete search history.

(56) References Cited

U.S. PATENT DOCUMENTS

| | | | |
|---|---|---|---|
| 3,968,148 A | 7/1976 | Leister et al. | |
| 5,691,284 A * | 11/1997 | Beyer | .................. C10M 143/00 508/472 |
| 6,066,603 A | 5/2000 | Emert et al. | |
| 9,617,495 B2 | 4/2017 | Ghahary et al. | |
| 11,618,797 B2 | 4/2023 | Maier et al. | |
| 2007/0197409 A1* | 8/2007 | Scherer | ................ C10M 169/04 525/244 |
| 2013/0165360 A1 | 6/2013 | Patil et al. | |
| 2015/0307697 A1 | 10/2015 | Mastrangelo et al. | |
| 2022/0195091 A1 | 6/2022 | Maier et al. | |

FOREIGN PATENT DOCUMENTS

| | | |
|---|---|---|
| DE | 2243 064 | 3/1973 |
| DE | 3223 694 | 3/1983 |
| DE | 10 2010 028 195 | 10/2011 |
| EP | 0 471 266 | 2/1992 |
| WO | 96/17517 | 6/1996 |
| WO | 01/46350 | 6/2001 |
| WO | 2010/014655 | 2/2010 |
| WO | 2019/175300 | 9/2019 |
| WO | 2020/078770 | 4/2020 |
| WO | 2020/200866 | 10/2020 |

OTHER PUBLICATIONS

Bataille et al., "Preparation and Characterization of a Viscosity Index Improver for Naphthenic and Paraffinic Base Oils", Journal of Solution Chemistry, vol. 23, No. 2, Jul. 12, 1994, pp. 325-338.
Extended European Search Report dated Oct. 26, 2022, in European Patent Application No. 22174980.7, 5 pages.
Mohamad et al., "Investigation of polyacrylates copolymers as lube oil viscosity index improvers", Journal of Petroleum Science and Engineering, vol. 100, 2012, pp. 173-177.
Ray et al., "Poly-α-olefin-based synthetic lubricants: a short review on various synthetic routes", Lubrication Science, vol. 24, 2012, pp. 23-44.
U.S. Pat. No. 11,618,797, Apr. 4, 2023, 2022/0195091, Maier et al.

* cited by examiner

Primary Examiner — Prem C Singh
Assistant Examiner — Francis C Campanell
(74) Attorney, Agent, or Firm — Grüneberg and Myers PLLC

(57) ABSTRACT

Acrylate-olefin copolymers and a method for the preparation of these copolymers are provided. Lubricant compositions can contain the aforementioned copolymers. The copolymers are useful as a lubricant additive or a synthetic base fluid in a lubricating oil composition, preferably in a gear oil composition, a transmission oil composition, a hydraulic oil composition, an engine oil composition, a marine oil composition, an industrial lubricating oil composition or in grease.

22 Claims, No Drawings

ACRYLATE-OLEFIN COPOLYMERS AS HIGH VISCOSITY BASE FLUIDS

BACKGROUND OF THE INVENTION

Field of the Invention

The invention relates to acrylate-olefin copolymers and to a method for the preparation of these polymers. The present invention is also directed to lubricant compositions comprising the aforementioned copolymers, as well as to the use of the copolymers as a lubricant additive or a synthetic base fluid in a lubricating oil composition, preferably in a gear oil composition, a transmission oil composition, a hydraulic oil composition, an engine oil composition, a marine oil composition, an industrial lubricating oil composition or in grease.

The present invention relates to the field of lubrication. Lubricants are compositions that reduce friction between surfaces. In addition to allowing freedom of motion between two surfaces and reducing mechanical wear of the surfaces, a lubricant also may inhibit corrosion of the surfaces and/or may inhibit damage to the surfaces due to heat or oxidation. Examples of lubricant compositions include, but are not limited to, engine oils, transmission fluids, gear oils, industrial lubricating oils, grease and metalworking oils.

DESCRIPTION OF RELATED ART

Lubricants typically contain a base fluid and variable amounts of additives. Conventional base fluids are hydrocarbons, such as mineral oils. The terminology base oil or base fluid is commonly used interchangeably. Here, base fluid is used as a general term.

A wide variety of additives may be combined with the base fluid, depending on the intended use of the lubricant. Examples of lubricant additives include, but are not limited to, viscosity index improvers, thickeners, oxidation inhibitors, corrosion inhibitors, dispersing agents, high pressure additives, anti-foaming agents and metal deactivators.

Typical non-polymeric base fluids are less effective as lubricants, because of their low viscosity and further decreased viscosity at higher operating temperatures. Therefore, polymeric additives are used to thicken the base oil and reduce the change in viscosity with change in temperature. The term Viscosity Index (VI) is used to describe this change in viscosity with temperature. The lower the VI, the greater the change in viscosity with temperature, and vice versa. Thus, a high VI is desired for lubricant formulations. In order to improve VI, polymeric additives or Viscosity Index Improvers (VII) may be added to a lubricant formulation.

It is well-known in the art that alkyl acrylates are not recommended in VI improver application, and commercial VI improvers are based on methacrylates. While literature (Rashad et al. J. of Petr. Sci. and Engineering 2012, 173-177; Evin et al. J. of Sol. Chem 1994, 325-338) and patents (WO96/17517) exist, it is generally known that the performance of polyacrylates as VI improver is inferior to the ones of polymethacrylates. Especially in WO96/17517, it is mentioned that it was unexpectedly found that poly(alkyl acrylate) esters typically fail to adequately reduce the effect of temperature on viscosity when used in the hydraulic fluids.

The drawback of adding polymeric additives to a lubricant formulation is that they will undergo shear stress and will mechanically degrade over time. Higher molecular weight polymers are better thickeners but will be more prone to shear stress leading to polymer degradation. In order to decrease the amount of polymer degradation, the molecular weight of a polymer can be decreased, thereby obtaining a more shear stable polymer. These shear stable low molecular weight polymers are no longer very effective thickeners and must be used in larger concentrations in the lubricant in order to reach a desired viscosity. These low molecular weight polymers typically have molecular weights below 20,000 g/mol and are also called synthetic high viscosity base fluids. High viscosity base fluids are used to lift the VI and to thicken lubricant formulations with demanding shear stability requirements. A typical application are gear oils which have very demanding requirements due high mechanical stress and a broad temperature range in operation.

Typical products in this market are high viscosity polyalphaolefins (PAOs) and metallocene polyalphaolefins (mPAOs), typically sold in viscosity ranges from 40 to 300 cSt at 100° C. (Choudary et al. Lubr. Sci. 2012, 23-44), whose key feature is good handling properties in term of viscosity since these base fluids are polymeric in nature and provide for an improved viscosity index. However, the apolar nature of the PAO base oils, DI packages and ageing products are a disadvantage as this low polarity characteristic can lead to poor solubility in oil, which can cause subsequent problems.

It has been already described that higher polarity is provided by copolymers of alpha-olefins with maleates (DE3223694), copolymers of alpha-olefins and acrylates (DE2243064), copolymers of alpha-olefins and methacrylates (EP0471266) or terpolymers based on the aforementioned monomers (WO2020/078770). Alternatively, oil compatible polyesters (WO01/46350), poly alkyl(meth)acrylates (DE102010028195) or polyvinylethers (US2013/0165360) can be applied. A big advantage when polar high viscosity base fluids are used is that no polar low viscous fluids, such as esters, must be used as compatibilizers for the polar lubricant additives. Polar low viscous fluids are known to cause problems with coatings and seals which is less of an issue for high viscosity fluids.

Copolymers of different (meth)acrylates and olefins have been reported as being suitable base fluids for application in industrial gear oils. For example, WO2020/088770 describes terpolymers made from (meth)acrylates, olefins and maleates used in industrial gear oil formulations but all examples are based on dodecene. Furthermore, WO2020/200866 and WO2019/175300 describe copolymers of alkyl (meth)acrylates with ethylene, and their use in lubricants. However, even when the copolymers are mixed in formulations with excellent base oils, the reported low temperature properties (pour points all above −40° C.) require further improvement to fulfill the lubricant formulations market requirements.

U.S. Pat. No. 6,066,603 discloses highly branched copolymers derived from one or more olefins including ethylene and C3-C20 alpha-olefins such as propylene and 1-butene, and at least one polar monomer, preferably selected from the group consisting of methyl acrylate, ethyl acrylate, tert-butyl acrylate, methyl methacrylate, methyl ethacrylate, ethyl methacrylate, ethyl ethacrylate, methyl vinyl ketone and acrylamide. Very small amounts of polar monomer are incorporated in the polymer (maximum of one polar moiety for each 1,000 Mn segment of polymer). The polar monomer terminates the branches and offers the potential for further functionalization. It is described that the polymer can be used as a fuel or lubricant additive, but no concrete example of lubricant compositions is provided in the patent.

Olefin-acrylate copolymers for wax-modification are also described in US2015/0307697. The olefin-(meth)acrylates composition is designed so that either the hydrocarbonyl group of the (meth)acrylate or the alpha-olefin comprises more than 16 and up to 50 carbon atoms, or both. Herein long waxy side chains are included for crystallization effects, which are unwanted in high viscosity base stocks.

SUMMARY OF THE INVENTION

It was therefore an object of the present invention to provide highly shear stable synthetic base fluids or lubricating oil additives, which, in lubricant oil compositions, have a positive influence on oil solubility and component solubility, as well as on low temperature performance. Furthermore, the new polymers should be able to thicken an oil to a desired viscosity. These highly shear stable copolymers should also have a high viscosity index to reduce the effect of changes in viscosity with temperature.

The inventors of the present invention have surprisingly found that acrylate-olefin copolymers obtained from a monomer composition combining short olefins with specific acrylate monomers, as defined below, are able to meet the strict low-temperature requirements of market lubricant formulations at lower polymer treat rates, without compromising on other performance parameters. This treat rate advantage makes the solution commercially more attractive. As exemplified in the experimental part of the present invention, it has been found that the specific weight ratio combination of acrylate monomers as defined below, with short-chain $C_4$-$C_6$ alpha-olefins are crucial to achieve a combination of high VI and good low temperature properties, which was unexpected.

Accordingly, a first aspect of the invention is an acrylate-olefin copolymer as defined in embodiments below.

A second aspect of the invention is a method for preparing the acrylate-olefin copolymers according to the invention.

A third aspect of the invention is a lubricant composition comprising at least one base oil and at least one acrylate-olefin copolymer according to the invention.

A fourth aspect of the invention is the use of these acrylate-olefin copolymers as lubricant additive or synthetic base fluid in a lubricating oil composition, preferably in a gear oil composition, a transmission oil composition, a hydraulic oil composition, an engine oil composition, a marine oil composition, an industrial lubricating oil composition or in grease.

The invention also includes the following embodiments:
1. A copolymer comprising:
   a) 70 to 95% by weight, based on the total weight of the copolymer, of monomer units derived from an acrylate of formula (I),

wherein $R_1$ means a linear or branched alkyl group having from 4 to 18 carbon atoms and is selected from the group consisting of a $C_4$ linear alkyl group, a $C_6$-$C_{10}$ linear alkyl group, a $C_8$-$C_{18}$ branched alkyl group, a $C_{11}$-$C_{18}$ linear alkyl group or a mixture thereof, and wherein the monomer units derived from the acrylate of formula (I) are selected from 0 to 45% by weight of an acrylate of formula (I) wherein $R_1$ is a $C_4$ linear alkyl group; 0 to 95% by weight of an acrylate of formula (I) wherein $R_1$ is a $C_8$-$C_{18}$ linear alkyl group; 0 to 95% by weight of an acrylate of formula (i) wherein $R_1$ is a $C_{11}$-$C_{18}$ branched alkyl group; 0 to 45% by weight of an acrylate of formula (I) wherein $R_1$ is a $C_{11}$-$C_{18}$ linear alkyl group; or a mixture thereof, based on the total weight of the copolymer,
   b) 5 to 30% by weight, based on the total weight of the copolymer, of monomer units derived from at least one non-functionalized alpha-olefin of formula (II),

wherein $R_2$ means a linear alkyl group having from 2 to 4 carbon atoms,
   and wherein the copolymer has a weight-average molecular weight from 5,000 to 35,000 g/mol according to DIN 55672-1.
2. The copolymer according to embodiment 1, wherein the copolymer comprises from 75 to 95% by weight, preferably from 80 to 95% by weight, of monomer units a) derived from acrylate monomer of formula (I), based on the total weight of the copolymer.
3. The copolymer according to embodiment 1 or 2, wherein the copolymer comprises from 5 to 25% by weight, preferably from 5 to 20% by weight, of monomer units b) derived from at least one non-functionalized alpha-olefin of formula (II), based on the total weight of the copolymer.
4. The copolymer according to any one of the previous embodiments, wherein the copolymer has a kinematic viscosity from 100 to 1,000 mm²/s at 100° C. according to ASTM D 445, preferably from 100 to 700 mm²/s at 100° C. according to ASTM D 445, more preferably from 100 to 500 mm² is at 100° C. according to ASTM D 445.
5. The copolymer according to any one of the previous embodiments, wherein the non-functionalized alpha-olefin b) of formula (II) is selected from the group consisting of butene, hexene or a mixture thereof.
6. The copolymer according to any one of the previous embodiments, wherein the amount of the acrylate of formula (I) wherein $R_1$ is a $C_4$ linear alkyl group is 0 to 40% by weight, preferably 0 to 30% by weight, based on the total weight of the copolymer.
7. The copolymer according to any one of the previous embodiments, wherein the acrylates a) of formula (I) are selected from the group consisting of butyl acrylate, n-octyl acrylate, 2-ethylhexyl acrylate, 2-propylheptyl acrylate, isononyl acrylate, lauryl acrylate, or a mixture thereof.
8. The copolymer according to any one of the previous embodiments, wherein the copolymer comprises 0 to 20% by weight, preferably 0 to 10% by weight, of monomer units derived from monomer c) selected from the list consisting of methacrylamides, fumarates, maleates and (meth)acrylates other than acrylates a), or a mixture thereof, based on the total weight of the copolymer.

9. The copolymer according to any one of the previous embodiments, wherein the total amount of monomer units derived from monomers a) and b) in the copolymer sums up to 80% by weight or more, preferably sums up to 90% by weight or more, based on the total weight of the copolymer.
10. The copolymer according to embodiment 8 or 9, wherein the total amount of monomer units derived from monomers a), b) and c) in the copolymer sums up to 90% by weight or more, preferably sums up to 95% by weight or more, more preferably sums up to 100% by weight, based on the total weight of the copolymer.
11. The copolymer according to any one of the previous embodiments, wherein the copolymer has a weight-average molecular weight from 7,000 to 25,000 g/mol, preferably from 10,000 to 25,000 g/mol, according to DIN 55672-1.
12. The copolymer according to any one of embodiments 1 to 11, wherein the copolymer has a polydispersity index from 1.0 to 3.5, preferably from 1.5 to 3.0.
13. A method for the preparation of a copolymer as defined in any one of embodiments 1 to 12, wherein the method comprises the steps of:
   i) providing a monomer composition,
   ii) initiating radical polymerization in the monomer composition to obtain the copolymer.
14. A lubricant composition comprising one or more base oil and at least one copolymer according to any one of embodiments 1 to 12.
15. Use of a copolymer as defined in any one of embodiments 1 to 12 as a lubricant additive or a synthetic base fluid in a lubricating oil composition, preferably in a gear oil composition, a transmission oil composition, a hydraulic oil composition, an engine oil composition, a marine oil composition, an industrial lubricating oil composition or in grease.

DETAILED DESCRIPTION OF THE INVENTION

Copolymer According to the Invention
The present invention relates to a copolymer comprising:
a) 70 to 95% by weight, based on the total weight of the copolymer, of monomer units derived from an acrylate of formula (I),

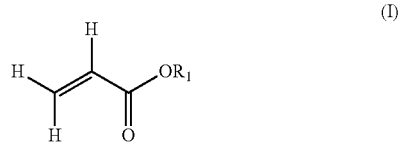

wherein $R_1$ means a linear or branched alkyl group having from 4 to 18 carbon atoms and is selected from the group consisting of a $C_4$ linear alkyl group, a $C_6$-$C_{10}$ linear alkyl group, a $C_8$-$C_{18}$ branched alkyl group, a $C_{11}$-$C_{18}$ linear alkyl group or a mixture thereof, and
wherein the monomer units derived from the acrylate of formula (I) are selected from
0 to 45% by weight of an acrylate of formula (I) wherein R; is a $C_4$ linear alkyl group,
0 to 95% by weight of an acrylate of formula (I) wherein $R_1$ is a $C_6$-$C_{10}$ linear alkyl group,
0 to 95% by weight of an acrylate of formula (I) wherein $R_1$ is a $C_8$-$C_{18}$ branched alkyl group.
0 to 45% by weight of an acrylate of formula (I) wherein $R_1$ is a $C_{11}$-$C_{18}$ linear alkyl group, or
a mixture thereof, based on the total weight of the copolymer,
b) 5 to 30% by weight, based on the total weight of the copolymer, of monomer units derived from at least one non-functionalized alpha-olefin of formula (II),

wherein $R_2$ means a linear alkyl group having from 2 to 4 carbon atoms,
and wherein the copolymer has a weight-average molecular weight from 5,000 to 35,000 g/mol according to DIN 55672-1.

The terms "polymer" and "copolymer" are used interchangeably to define the copolymer according to the present invention.

According to the present invention, the copolymer of the invention comprises 70 to 95% by weight, based on the total weight of the copolymer, of monomer units a) derived from acrylate monomer of formula (I). According to one aspect of the invention, it is preferred that the copolymer comprises from 75 to 95% by weight, more preferably from 80 to 95% by weight, of monomer units a) derived from acrylate monomer of formula (I), based on the total weight of the copolymer.

The acrylates a) of formula (I) refer to esters of acrylic acid with straight chain or branched alcohols having 4 to 18 carbon atoms. The term encompasses individual acrylic esters with an alcohol of a particular length, and likewise mixtures of acrylic esters with alcohols of different lengths. The acrylates a) of formula (I) are selected from the group consisting of acrylates having a $C_4$ linear alkyl group, a $C_6$-$C_{10}$ linear alkyl group, a $C_8$-$C_{18}$ branched alkyl group, a $C_{11}$-$C_{18}$ linear alkyl group or a mixture thereof. The monomer units derived from the acrylate of formula (I) are selected from 0 to 45% by weight, preferably 0 to 40% by weight, more preferably 0 to 30% by weight, of an acrylate of formula (I) wherein $R_1$ is a $C_4$ linear alkyl group; 0 to 95% by weight of an acrylate of formula (I) wherein $R_1$ is a $C_6$-$C_{10}$ linear alkyl group: 0 to 95% by weight of an acrylate of formula (I) wherein $R_1$ is a $C_8$-$C_{18}$ branched alkyl group; 0 to 45% by weight of an acrylate of formula (I) wherein $R_1$ is a $C_{11}$-$C_{18}$ linear alkyl group; or a mixture thereof, based on the total weight of the copolymer.

The acrylate a) of formula (I), wherein $R_1$ is a $C_4$ linear alkyl group, corresponds to butyl acrylate.

Most preferred acrylate a) of formula (I), wherein $R_1$ is a $C_6$-$C_{10}$ linear alkyl group, is n-octyl acrylate.

Most preferred acrylates a) of formula (I), wherein $R_1$ is a $C_8$-$C_{18}$ branched alkyl group, are 2-ethylhexyl acrylate, 2-propylheptyl acrylate, isononyl acrylate, or a mixture thereof.

Most preferred acrylate a) of formula (I), wherein $R_1$ is a $C_{11}$-$C_{18}$ linear alkyl group, is lauryl acrylate.

Particularly preferred acrylates a) of formula (I) are selected from the group consisting of butyl acrylate, n-octyl acrylate. 2-ethylhexyl acrylate, 2-propylheptyl acrylate, isononyl acrylate, lauryl acrylate, or a mixture thereof.

According to the present invention, the copolymer of the invention comprises 5 to 30% by weight, based on the total weight of the copolymer, of monomer units derived from at least one non-functionalized alpha-olefin of formula (II), wherein $R_2$ means a linear alkyl group having from 2 to 4 carbon atoms. According to one aspect of the invention, it is preferred that the copolymer comprises from 5 to 25% by weight, more preferably from 5 to 20% by weight, of monomer units b) derived from at least one non-functionalized alpha-olefin of formula (II), based on the total weight of the copolymer.

Most preferred non-functionalized alpha-olefins b) of formula (II) are selected from the group consisting of butene, hexene or a mixture thereof.

According to another aspect of the invention, it is preferred that the copolymer has a kinematic viscosity from 100 to 1,000 mm² is at 100° C. according to ASTM D 445, more preferably from 100 to 700 mm²/s at 100° C. according to ASTM D 445, even more preferably from 100 to 500 mm²/s at 100° C. according to ASTM D 445.

According to another preferred aspect of the invention, the total content of monomer units derived from monomers a) and b) in the copolymer of the invention sums up to 80% by weight or more, more preferably sums up to 90% by weight or more, even more preferably sums up to 95% by weight or more, most preferably sums up to 98% by weight or more, most preferably sums up to 100% by weight, based on the total weight of the copolymer.

According to the present invention, the copolymer has a weight-average molecular weight from 5,000 to 35,000 g/mol, preferably from 7,000 to 25,000 g/mol, more preferably from 8,000 to 25,000 g/mol, even more preferably from 10,000 to 25,000 g/mol, according to DIN 55672-1.

In the present invention, the weight-average molecular weights ($M_w$) or number-average molecular weights ($M_n$) of the copolymers were determined by gel permeation chromatography (GPC) using PMMA calibration standards according to DIN 55672-1 using the following measurement conditions:

Eluent: tetrahydrofuran (THF)
Operation temperature: 35° C.
Columns: the column set consists of four columns: two columns SDV 106 Å, one column SDV 104 Å and one column SDV 103 Å (PSS Standards Service GmbH, Mainz, Germany), all with the size of 300×8 mm and an average particle size of 10 μm
Flow rate: 1 mL/min
Injected volume: 100 μL
Instrument: Agilent 1100 series consisting of an autosampler, pump and column oven
Detection device: a refractive index detector from Agilent 1100 series.

Preferably, the copolymers of the invention have a very low degree of cross-linking and a narrow molecular weight distribution, which further contributes to the shear resistance. The low degree of crosslinking and the narrow molecular weight are reflected in the polydispersity index of the copolymers. Preferably, the polydispersity index (PDI) of the copolymers according to the invention is in the range of 1.0 to 3.5, more preferably in the range of 1.5 to 3.0. A polydispersity index in the range of 1.0 to 3.5 is considered optimal for most industrial applications with regard to the shear resistance of the copolymers. The polydispersity index is defined as the ratio of weight-average molecular weight to number-average molecular weight ($M_w/M_n$).

The copolymers of the invention optionally comprise monomer units derived from monomer c), which is selected from the list consisting of methacrylamides, fumarates, maleates, (meth)acrylates other than acrylates a), or a mixture thereof. Preferably, the amount of monomer units derived from monomer c) in the resulting copolymer of the invention is from 0 to 20% by weight, more preferably from 0 to 10% by weight, even more preferably from 0.1 to 5% by weight, most preferably from 0.5 to 3% by weight, based on the total weight of the copolymer. Particularly preferred monomers c) are di-2-ethylhexyl maleate, N-3-dimethylamino propyl methacrylamide, di-2-ethylhexyl fumarate or a mixture thereof.

The term "(meth)acrylate" refers to esters of acrylic acid, esters of methacrylic acid or a mixture of esters of acrylic acid and methacrylic acid.

According to another preferred aspect of the invention, the total content of monomer units derived from monomers a), b) and c) in the copolymer of the invention sums up to 90% by weight or more, more preferably sums up to 95% by weight or more, even more preferably sums up to 98% by weight or more, most preferably sums up to 100% by weight, based on the total weight of the copolymer.

According to the invention, the copolymer is a statistical copolymer, wherein the monomeric units a), b) and optionally c) are distributed randomly, and sometimes unevenly, in the copolymer.

Surprisingly, it was observed that the combination of monomer units a) of formula (I) with short chain alpha olefin monomer units b) of formula (II) in the copolymer, allows to prepare copolymers with great properties when used as an additive or a base fluid in a lubricant oil formulation. As shown in the experimental part of the present invention, the acrylate-olefin copolymers of the present invention, obtained from a monomer composition combining short olefins with specific acrylate monomers, meet the strict low-temperature requirements of market lubricant formulations, even at low polymer treat rates, without compromising on other performance parameters. Unexpectedly, it was also found that the specific weight ratio combination of acrylate monomers as described with short-chain $C_4$-$C_6$ alpha-olefins are crucial to achieve a combination of high VI and good low temperature properties.

Preferable Copolymers of the Invention

According to a preferred aspect of the invention, the copolymer comprises:

a) 70 to 95% by weight, based on the total weight of the copolymer, of monomer units derived from an acrylate of formula (I),

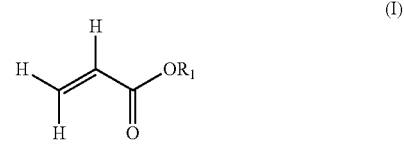

wherein $R_1$ means a linear or branched alkyl group having from 4 to 18 carbon atoms and the monomer units derived from the acrylate of formula (I) are selected from
0 to 30% by weight of butyl acrylate,
0 to 95% by weight of n-octyl acrylate,
0 to 95% by weight of 2-ethylhexyl acrylate, 2-propylheptyl acrylate, isononyl acrylate or a mixture thereof, and
0 to 45% by weight of lauryl acrylate,
or a mixture thereof, based on the total weight of the copolymer, b) 5 to 30% by weight, based on the total weight of the copolymer, of monomer units derived from at least one non-functionalized alpha-olefin of formula (II),

(II)

wherein $R_2$ means a linear alkyl group having from 2 to 4 carbon atoms, and c) 0 to 10% by weight, based on the total weight of the copolymer, of monomer units selected from the list consisting of methacrylamides, fumarates, maleates, (meth)acrylates other than acrylates a), or a mixture thereof, and wherein the copolymer has a weight-average molecular weight from 5,000 to 35,000 g/mol, preferably from 7,000 to 25,000 g/mol, even more preferably from 8,000 to 25,000 g/mol, most preferably from 10,000 to 25,000 g/mol, according to DIN 55672-1.

According to a preferred embodiment, the total content of monomer units of monomers a), b) and c) sums up to 95% by weight or more, more preferably 98% by weight or more, even more preferably 100% by weight, based on the total weight of the copolymer.

Method for Preparing the Copolymer According to the Invention

According to the present invention, the above-mentioned polymers are prepared following the method comprising the steps of:

i) providing a monomer composition as described above; and ii) initiating radical polymerization in the monomer composition.

Standard free-radical polymerization is detailed, inter alia, in Ullmann's Encyclopedia of Industrial Chemistry, Sixth Edition. In general, a polymerization initiator and optionally a chain transfer agent are used for this purpose.

The polymerization step (ii) can be conducted under standard pressure, reduced pressure or elevated pressure. Preferably, the polymerization is conducted at a pressure range from standard pressure to 50 bar, preferably from standard pressure to 40 bar. In the context of the present invention, the term "standard pressure" means no added pressure, but ambient or atmospheric pressure.

For the radical copolymerization of olefins with acrylates, the polymerization temperature is critical. In general, the copolymerization temperature is in the range from 110 to 160° C., preferably from 120 to 140° C.

The polymerization step ii) may be performed with or without dilution in oil or any solvent. Preferably, the polymerization step (ii) is made without dilution in oil or any solvent.

Preferably, step (ii) comprises the addition of a radical initiator. Preferably, the radical initiator is selected from di-tert-amyl-peroxide, 2,2-di-(tert-butylperoxy) butane, 1,1-di-tert-butylperoxy-3.3.5-trimethylcyclohexane or di-tert-butyl-peroxide. Preferably, the total amount of radical initiator relative to the total weight of the monomer mixture is 0.01 to 5% by weight, more preferably 0.1 to 1% by weight. Preferably, the total amount of radical initiator is added continuously over the course of the copolymerization reaction (ii).

Preferably, the copolymerization step (ii) is made by feeding the acrylate monomers a), and optionally the monomers c) or any other comonomers, together with the initiator to the non-functionalized alpha-olefin monomers b). Preferably, the total reaction time of the radical polymerization is 2 to 5 hours, more preferably 2 to 4 hours, most preferably 3 hours.

In another preferred aspect of the invention, a third step iii) is optionally performed, corresponding to a distillation step to remove the unreacted alpha-olefin monomer b). Preferably, residual unreacted alpha-olefin monomer b) is removed by distillation at 130'C and pressures as low as 15 mbar using a rotary evaporator.

Lubricating Oil Compositions

As indicated above, the present invention also relates to a lubricating oil composition comprising at least one base oil and at least one copolymer as defined in the present invention.

The base oils correspond to lubricant base oils, mineral, synthetic or natural, animal or vegetable oils suited to their use/chosen depending on the intended use.

The base oils used in formulating the lubricating oil compositions according to the present invention include, for example, conventional base stocks selected from API (American Petroleum Institute) base stock categories known as Group I, Group II, Group III, Group IV and Group V. The Group I and II base stocks are mineral oil materials (such as paraffinic and naphthenic oils) having a viscosity index (or VI) of less than 120. Group I is further differentiated from Group II in that the latter contains greater than 90% saturated materials and the former contains less than 90% saturated material (that is more than 10% unsaturated material). Group III is considered the highest level of mineral base oil with a VI of greater than or equal to 120 and a saturates level greater than or equal to 90%. Group IV base oils are polyalphaolefins (PAO). Group V base oils are esters and any other base oils not included in Group I to IV base oils. These base oils can be used individually or as a mixture.

Preferably, the base oil included in the lubricating oil composition of the present invention is selected from the group consisting of an API Group II base oil, an API Group III base oil or a mixture thereof.

Most preferably, the lubricant composition comprises an API Group III base oil or a mixture thereof. In a preferred embodiment of the invention, the lubricating oil composition comprises from 0.1 to 99.9% by weight, preferably from 1 to 95% by weight, of at least one base oil and from 0.1 to 99.9% by weight, preferably from 5% to 99% by weight, of at least one copolymer according to the present invention, based on the total weight of the lubricating composition.

The lubricating oil compositions according to the present invention may also comprise any other additional additives suitable for use in the formulations. These additives include additional viscosity index improvers, pour point depressants, dispersants, demulsifiers, defoamers, lubricity additives, friction modifiers, antioxidants, detergents, dyes, corrosion inhibitors and/or odorants.

Applications for the Copolymer of the Invention

The invention also relates to the use of the copolymer according to the present invention as a lubricant additive or a synthetic base fluid in a lubricating oil composition, preferably in a gear oil composition, a transmission oil composition, a hydraulic oil composition, an engine oil composition, a marine oil composition, an industrial lubricating oil composition or in grease.

Experimental Part

The invention is further illustrated in detail hereinafter with reference to examples and comparative examples, without any intention to limit the scope of the present invention. All percentages in relation to monomers or base fluids given in the tables below are weight percentages (wt %).

Abbreviations

Anglamol 6043 additive package
BA butyl acrylate
But 1-butene
BF-40 Brookfield viscosity measured at −40° C. in accordance with ASTM D2983
BV bulk viscosity
BV100 bulk viscosity @100° C. in accordance with ASTM D445
$C_2$ Acr $C_2$ alkyl acrylate
$C_4$ Acr $C_4$ linear alkyl acrylate
$C_6$-$C_{10}$ Acr $C_6$-$C_{10}$ linear alkyl acrylate
$C_8$-$C_{18}$ b-Acr $C_8$-$C_{18}$ branched alkyl acrylate
$C_{11}$-$C_{18}$ Acr $C_{11}$-$C_{18}$ linear alkyl acrylate
cSt centistokes corresponding to mm²/s in SI units
cP centipoise corresponding to mPa·s in SI units
DAPO di-tert-amyl peroxide
DBPO di-tert-butyl peroxide
Dec 1-decene
EA ethyl acrylate
EHA 2-ethylhexyl acrylate
Hex 1-hexene
INA isononyl acrylate
Ini initiator
KRL Tapered Roller Bearing Shear Stability Test according to CEC L-45-A-99
KV kinematic viscosity measured according to ASTM D445
$KV_{40}$ kinematic viscosity measured @40° C. to ASTM D445
$KV_{100}$ kinematic viscosity measured @100° C. to ASTM D445
LA lauryl acrylate or dodecyl acrylate
$M_n$ number-average molecular weight
$M_w$ weight-average molecular weight
n.m. not measured
nOA n-octyl acrylate
PDI polydispersity index
PPD pour point depressant
SL shear loss determined at 100° C. after KRL (20 hours run at 60° C.)
VI viscosity index
VPL 1-300 Evonik VISCOPLEX® 1-300, polyalkylmethacrylate pour point depressant
Yubase 4 Group III base oil from SK Lubricants with a $KV_{100}$ of 4 mm²/s
Yubase 6 Group III base oil from SK Lubricants with a $KV_{100}$ of 6 mm²/s
Yubase 8 Group III base oil from SK Lubricants with a $KV_{100}$ of 8 mm²/s
Test Methods
KV ASTM D445
VI ASTM D2270
KRL CEC L-45-A-99
BF ASTM D2983

In the present invention, the bulk viscosity (BV) of the polymer (product obtained from polymerization reaction) corresponds to the kinematic viscosity (KV) of the resulting product of the polymerization measured in accordance with ASTM D445. Thus, the bulk viscosity of the polymers (BV100) as shown in Table 2 below, were measured as kinematic viscosity at 100° in accordance with ASTM D445.

The solubility of each polymer in oil was tested by mixing 20% by weight of polymer in 80% by weight of Yubase 4 base oil. A polymer is considered not to be soluble when a hazy or two-phase mixture is obtained. The result of this solubility test in oil for each polymer is also shown in Table 2 below.

EXAMPLES

Synthesis 1: Acylate-Hexene Copolymer (Ex. 1)

6.99 g of DAPO (1.0 wt % relative to the acrylate in the feed) mixed with 707.8 g EHA was slowly fed to 486.2 g of 1-hexene in 170.4 g heptane (25:75 solvent to olefin monomer) under nitrogen at 130° C. for 3 hours. After stirring for another hour, the resulting clear and colorless polymer was cooled down and filtered under pressure using a filter aid. Subsequently, the residual hexene was removed by distillation at 130° C. and at a pressure of less than 15 mbar using a rotary evaporator. The amount of monomer incorporated in the polymer is determined by NMR analysis.

Inventive examples 3 and 4, as well as comparative examples 2* to 5*, were prepared in the same way as inventive example 1, except that the amounts of reactants and/or other reaction conditions were changed as listed in Tables 1 and 2. For inventive example 4 and comparative example 5*, the reaction mixtures after the feed and stirring steps were heated at 140° C. for 30 minutes before cooling. Furthermore, comparative example 4* was prepared with 2,2-di-(tert-butylperoxy) butaneas initiator and comparative example 3* with 1,1-di-tert-butylperoxy-3,3,5-trimethylcyclohexane as initiator.

Synthesis 2: Acrylate-Butene Copolymer (Ex.2)

2.3 g of DAPO (0.3 wt % relative to the acrylate in the feed) mixed with 766 g EHA was slowly fed to 457 g of 1-butene under nitrogen at 130° C. for 3 hours. After stirring for another hour, the resulting clear and colorless polymer was cooled down and filtered under pressure using a filter aid. Subsequently, the residual monomer was removed by distillation at 130° and at a pressure of less than 15 mbar using a rotary evaporator. The amount of monomer incorporated in the polymer is determined by NMR analysis.

Synthesis 3: Acrylate-Hexene Copolymer with Acrylate Mixture (Ex.5)

4.63 g of DAPO (0.7 wt % relative to the acrylate in the feed) mixed with 335.7 g EHA and 323.7 g LA was slowly fed to 511.4 g of 1-hexene in 184.9 g heptane (25:75 solvent to olefin monomer) under nitrogen at 130° C. for 3 hours. After stirring for another hour, the resulting clear and colorless polymer was cooled down and filtered under pressure using a filter aid. Subsequently, the residual hexene was removed by distillation at 130° C. and at a pressure of less than 15 mbar using a rotary evaporator. The amount of monomer incorporated in the polymer is determined by NMR analysis.

Inventive examples 5 to 11, as well as comparative examples 6* to 9* were prepared in the same way as inventive example 5, except that the amounts of reactants and/or other reaction conditions were changed as listed in Tables 1 and 2. For inventive examples 9 to 11, the reaction mixtures after the feed and stirring steps were heated at 140° C. for 30 minutes before cooling. Furthermore, inventive example 9 was prepared with 2,2-di-(tert-butylperoxy) butane as initiator.

Synthesis 4: Acrylate-Hexene Copolymer Synthesis with 2-Step Addition of the Initiator Ex.12)

5.94 g of DAPO (0.7 wt % relative to the acrylate in the feed) were used in total. $1/4^{th}$ of the initiator was mixed with 536.3 g 1-hexene and charged to the reactor. The remaining $3/4^{th}$ of the initiator mixed with 842.0 g INA was then slowly fed to the reactor under nitrogen at 130° C. for 3 hours. After stirring for another hour, the reaction mixture was heated at 140° C. for 30 minutes. Then, the resulting clear and colorless polymer was cooled down and filtered under pressure using a filter aid. Subsequently, the residual hexene was removed by distillation at 130° C. and at a pressure of less than 15 mbar using a rotary evaporator. The amount of monomer incorporated in the polymer is determined by NMR analysis.

Inventive example 13 was prepared in the same way as inventive example 12, except that the amounts of reactants and other reaction conditions were changed as listed in Tables 1 and 2.

Synthesis 5: Acrylate-Long-Chain Olefin Copolymer (Ex. 1*)

18 g of DBPO (0.3 wt % relative to the acrylate in the feed) dissolved in 6,000 g EHA was slowly fed to 1,500 g of 1-decene under nitrogen at 160° C. within 3 hours. After the feed had been finalized and stirring for 2 hours at 160° C., the resulting clear and colorless polymer was cooled down. Subsequently, the residual olefin was removed by distillation at 160° C. and pressures as low as 10 mbar using a rotary evaporator. The amount of decene incorporated in the polymer is determined gravimetrically assuming that no residual acrylate monomer is present.

Further details regarding the synthetic procedures of the individual examples are provided in Tables 1 and 2 together with basic properties of the polymers. In the context of the invention, the term "Solvent to olefin monomer" describes the approximate volume ratio between the solvent and all non-functionalized alpha-olefin monomers b). The term "Olefin eq" is defined as the molar equivalent of olefin to acrylate. The alpha-olefin monomers are always first charged to the reactor. The acrylate monomers and the initiator are then fed over a set period of time. For acrylate-olefin copolymers with acrylate mixtures, all acrylates were mixed with the initiator before feeding to the olefin. The temperatures given in Table 1 correspond to the reaction temperature during the acrylate/initiator feed.

Formulations comprising the inventive and comparative polymers of Table 2 were then prepared with the amounts of components as shown in Tables 3 and 4. The properties of the different formulations such as viscosity index, kinematic, viscosity, Brookfield viscosity and shear loss are also shown in Tables 3 and 4. The target was to get formulations fulfilling SAE 75W-90 standard (SAE is the organization Society of Automotive Engineers). Table 5 shows the properties of some formulations prepared using some comparative polymers of Table 2, which do not meet the requirements of 75W-90 formulations.

TABLE 1

Polymerization conditions for the preparation of acrylate-olefin copolymers

| | Ex# | Acrylate | Olefin | Ini [wt %] | T [° C.] | Solvent to olefin monomer | Olefin eq |
|---|---|---|---|---|---|---|---|
| Inventive Examples | Ex. 1 | EHA | Hex | 1.0 | 130 | 25:75 | 1.5 |
| | Ex. 2 | EHA | But | 0.3 | 130 | 0:100 | 2 |
| | Ex. 3 | nOA | Hex | 0.7 | 130 | 25:75 | 2 |
| | Ex. 4 | nOA | Hex | 0.7 | 130 | 25:75 | 2 |
| | Ex. 5 | EHA + LA | Hex | 0.7 | 130 | 25:75 | 2 |
| | Ex. 6 | EHA + LA | Hex | 0.7 | 130 | 25:75 | 2 |
| | Ex. 7 | EHA + LA | Hex | 0.7 | 130 | 25:75 | 2 |
| | Ex. 8 | BA + EHA + LA | Hex | 0.7 | 130 | 25:75 | 2 |
| | Ex. 9 | BA + EHA + LA | Hex | 0.5 | 125 | 0:100 | 2 |
| | Ex. 10 | nOA + EHA | Hex | 0.7 | 130 | 25:75 | 2 |
| | Ex. 11 | nOA + EHA | Hex | 0.7 | 130 | 25:75 | 2 |
| | Ex. 12 | INA | Hex | 0.7 | 130 | 0:100 | 1.5 |
| | Ex. 13 | INA | Hex | 1.0 | 130 | 25:75 | 1.5 |
| Comparative Examples | Ex. 1* | EHA | Dec | 0.3 | 160 | 0:100 | 0.33 |
| | Ex. 2* | EA | Hex | 0.7 | 130 | 25:75 | 2 |
| | Ex. 3* | BA | Hex | 1.0 | 130 | 25:75 | 1.5 |
| | Ex. 4* | BA | Hex | 0.7 | 125 | 0:100 | 2 |
| | Ex. 5* | LA | Hex | 0.7 | 130 | 25:75 | 2 |
| | Ex. 6* | EA + EHA | Hex | 1.0 | 130 | 25:75 | 2 |
| | Ex. 7* | BA + EHA | Hex | 0.7 | 130 | 25:75 | 2 |
| | Ex. 8* | BA + LA | Hex | 0.5 | 130 | 50:50 | 2 |
| | Ex. 9* | EHA + LA | Hex | 0.5 | 130 | 50:50 | 2 |

TABLE 2

Polymer properties of the prepared acrylate-olefin copolymers

| | Ex# | Acrylate | Olefin | incorporated acrylate [wt %] | | | | | incorporated olefin [wt %] | Mw [g/mol] | Mn [g/mol] | PDI | BV100 [mm²/s] | Oil solubility |
| | | | | $C_2$ Acr | $C_4$ Acr | $C_6$-$C_{10}$ Acr | $C_8$-$C_{18}$ b-Acr | $C_{11}$-$C_{18}$ Acr | | | | | | |
|---|---|---|---|---|---|---|---|---|---|---|---|---|---|---|
| Inventive Examples | Ex. 1 | EHA | Hex | — | — | — | 84.4 | — | 15.6 | 15,500 | 6,890 | 2.26 | 440.1 | soluble |
| | Ex. 2 | EHA | But | — | — | — | 92.8 | — | 7.2 | 16,600 | 6,940 | 2.32 | 427.3 | soluble |
| | Ex. 3 | nOA | Hex | — | — | 84.8 | — | — | 15.2 | 22,200 | 9,040 | 2.45 | 266.4 | soluble |
| | Ex. 4 | nOA | Hex | — | — | 81.4 | — | — | 18.6 | 16,600 | 7,300 | 2.27 | 182.2 | soluble |
| | Ex. 5 | EHA + LA | Hex | — | — | — | 44.6 | 39.9 | 15.5 | 17,600 | 7,810 | 2.25 | 206.3 | soluble |
| | Ex. 6 | EHA + LA | Hex | — | — | — | 69.7 | 15.5 | 14.8 | 15,800 | 7,070 | 2.24 | 300.7 | soluble |
| | Ex. 7 | EHA + LA | Hex | — | — | — | 75.3 | 7.9 | 16.8 | 14,700 | 6,620 | 2.22 | 307.3 | soluble |
| | Ex. 8 | BA + EHA + LA | Hex | — | 18.9 | — | 28.1 | 38.5 | 14.5 | 19,100 | 8,190 | 2.34 | 239.0 | soluble |
| | Ex. 9 | BA + EHA + LA | Hex | — | 13.4 | — | 39.6 | 28.2 | 18.7 | 16,300 | 7,210 | 2.26 | 245.1 | soluble |
| | Ex. 10 | nOA + EHA | Hex | — | — | 41.8 | 41.3 | — | 16.8 | 15,600 | 6,940 | 2.25 | 244.9 | soluble |
| | Ex. 11 | nOA + EHA | Hex | — | — | 58.7 | 25.7 | — | 15.6 | 15,300 | 6,770 | 2.26 | 275.1 | soluble |
| | Ex. 12 | INA | Hex | — | — | — | 86.9 | — | 13.1 | 19,400 | 7,850 | 2.47 | 363.6 | soluble |
| | Ex. 13 | INA | Hex | — | — | — | 87.5 | — | 12.5 | 14,600 | 6,440 | 2.26 | 252.0 | soluble |
| Comparative Examples | Ex. 1* | EHA | Dec | — | — | — | 82.0 | — | 18.0 | 15,600 | 6,190 | 2.52 | 279.3 | soluble |
| | Ex. 2* | EA | Hex | 78.7 | — | — | — | — | 21.3 | 19,000 | 7,580 | 2.51 | n.m. | not soluble |
| | Ex. 3* | BA | Hex | — | 78.7 | — | — | — | 21.3 | 15,200 | 6,430 | 2.37 | n.m. | not soluble |
| | Ex. 4* | BA | Hex | — | 77.1 | — | — | — | 22.9 | 16,800 | 6,330 | 2.65 | 471.8 | not soluble |
| | Ex. 5* | LA | Hex | — | — | — | — | 85.6 | 14.4 | 18,300 | 8,980 | 2.04 | 150.9 | soluble |
| | Ex. 6* | EA + EHA | Hex | 17.0 | — | — | 65.2 | — | 17.9 | 16,000 | 6,810 | 2.35 | 492.3 | soluble |
| | Ex. 7* | BA + EHA | Hex | — | 46.9 | — | 34.9 | — | 18.2 | 18,200 | 6,960 | 2.61 | 454.1 | soluble |
| | Ex. 8* | BA + LA | Hex | — | 30.5 | — | — | 56.3 | 13.2 | 20,700 | 8,590 | 2.41 | 171.7 | soluble |
| | Ex. 9* | EHA + LA | Hex | — | — | — | 27.1 | 59.1 | 13.8 | 15,100 | 6,470 | 2.33 | 141.4 | soluble |

TABLE 3

75W-90 formulations of acrylate-olefin copolymers

| | Inventive Examples | | | | | Comparative Example |
|---|---|---|---|---|---|---|
| Form. Ex. | F-1 | F-2 | F-3 | F-4 | F-5 | F-1* |
| Ex. 1 [wt %] | 29.7 | | | | | |
| Ex. 2 [wt %] | | 29.5 | | | | |
| Ex. 3 [wt %] | | | 24.3 | | | |
| Ex. 4 [wt %] | | | | 26.4 | | |
| Ex. 12 [wt %] | | | | | 26.2 | |
| Ex. 1* [wt %] | | | | | | 32.0 |
| Anglamol 6043 [wt %] | 6.5 | 6.5 | 6.5 | 6.5 | 6.5 | 6.5 |
| VPL 1-300 [wt %] | 0.5 | 0.5 | 0.5 | 0.5 | 0.5 | 0.5 |
| Yubase 4 [wt %] | 31.3 | 33.5 | — | — | 16.8 | 21.0 |
| Yubase 6 [wt %] | 32.0 | 30.0 | 68.7 | 51.6 | 50.0 | 40.0 |
| Yubase 8 [wt %] | — | — | — | 15.0 | — | — |
| KV40 [mm²/s] | 90.9 | 91.9 | 88.1 | 89.2 | 91.2 | 90.7 |
| KV100 [mm²/s] | 14.4 | 14.4 | 14.7 | 14.4 | 14.6 | 14.4 |
| VI | 164 | 163 | 174 | 167 | 167 | 164 |
| BF-40 [mPa · s] | 115,000 | 131,000 | 136,000 | 130,000 | 120,000 | 122,000 |
| SL 100° C. [%] | 5.3 | 5.7 | 6.7 | 5.0 | 6.7 | 5.0 |

TABLE 4

75W-90 formulations comprising inventive acrylate-olefin copolymers prepared with acrylate mixtures

| Form. Ex. | F-6 | F-7 | F-8 | F-9 | F-10 | F-11 | F-12 |
|---|---|---|---|---|---|---|---|
| Ex. 5 [wt %] | 29.5 | | | | | | |
| Ex. 6 [wt %] | | 28.7 | | | | | |
| Ex. 7 [wt %] | | | 29.4 | | | | |
| Ex. 8 [wt %] | | | | 28.1 | | | |
| Ex. 9 [wt %] | | | | | 27.8 | | |

TABLE 4-continued 75W-90 formulations comprising inventive acrylate-
olefin copolymers prepared with acrylate mixtures

| Form. Ex. | F-6 | F-7 | F-8 | F-9 | F-10 | F-11 | F-12 |
|---|---|---|---|---|---|---|---|
| Ex. 10 [wt %] | | | | | | 29.0 | |
| Ex. 11 [wt %] | | | | | | | 29.4 |
| Anglamol 6043 [wt %] | 6.5 | 6.5 | 6.5 | 6.5 | 6.5 | 6.5 | 6.5 |
| VPL 1-300 [wt %] | 0.5 | 0.5 | 0.5 | 0.5 | 0.5 | 0.5 | 0.5 |
| Yubase 4 [wt %] | 23.5 | 21.3 | 21.0 | 24.9 | 15.2 | 14.0 | 13.6 |
| Yubase 6 [wt %] | 40.0 | 43.0 | 42.6 | 40.0 | 50.0 | 50.0 | 50.0 |
| KV40 [mm$^2$/s] | 86.1 | 89.0 | 89.6 | 86.1 | 87.9 | 89.9 | 93.0 |
| KV100 [mm$^2$/s] | 14.3 | 14.2 | 14.1 | 14.4 | 14.1 | 14.4 | 14.7 |
| VI | 173 | 164 | 162 | 174 | 166 | 167 | 165 |
| BF-40 [mPa · s] | 133,000 | 122,000 | 122,000 | 121,000 | 119,000 | 120,000 | 132,000 |
| SL 100° C. [%] | 4.3 | 3.6 | 3.4 | 5.4 | 3.8 | 5.6 | 7.0 |

TABLE 5

Formulations of comparative acrylate-olefin copolymers
with poor low temperature properties, not fulfilling
75W-90 formulation requirements

| Form. Ex. | F-2* | F-3* | F-4* | F-5* | F-6* |
|---|---|---|---|---|---|
| Ex. 5* [wt %] | 34.5 | | | | |
| Ex. 6* [wt %] | | 32.0 | | | |
| Ex. 7* [wt %] | | | 31.2 | | |
| Ex. 8* [wt %] | | | | 33.7 | |
| Ex. 9* [wt %] | | | | | 36.6 |
| Anglamol 6043 [wt %] | 6.5 | 6.5 | 6.5 | 6.5 | 6.5 |
| VPL 1-300 [wt %] | 0.5 | 0.5 | 0.5 | 0.5 | 0.5 |
| Yubase 4 [wt %] | 58.5 | 61.0 | 61.8 | 59.3 | 56.4 |
| KV40 [mm$^2$/s] | 79.7 | 88.3 | 86.8 | 78.9 | 79.4 |
| KV100 [mm$^2$/s] | 14.4 | 14.1 | 14.2 | 14.3 | 14.2 |
| VI | 190 | 165 | 170 | 189 | 185 |
| BF-40 [mPa · s] | solid | 700,000 | 178,000 | solid | solid |

As shown in Table 2 above, the inventive polymers according to the invention are all soluble in oil. In contrast, some comparative polymers are not soluble in oil, such as comparative Ex.2* to 4* with high amounts of $C_4$ linear alkyl acrylate, or with shorter alkyl acrylates such as ethyl acrylate. Therefore, these comparative examples were not tested in formulations as they do not fulfill the requirement of solubility in oil.

As shown in Tables 3 and 4 above, the 75W-90 formulations comprising the inventive acrylate-olefin copolymers according to the invention deliver optimized viscosity-temperature properties. The inventive copolymers according to the invention used in the formulations have a favorable combination of viscosity (KV40 and KV100), viscosity index (VI), low temperature properties (BF) and shear stability (SL). For some inventive formulations, a reduced treat rate is achieved without negative effects on other formulation properties, especially low temperature viscosity (BF-40) and shear stability (SL 100° C.) which are the most important parameters of the 75W-90 specification. To fulfill the 75W-90 formulation requirements, it is observed that less polymer is required in the formulations using short chain olefin hexene- or butene-containing polymers as thickeners (F-1 and F-2) compared to a formulation comprising a longer chain alpha olefin decene-containing copolymer (F-1*).

Interestingly, the combination of three different alkyl acrylates from Ca linear alkyl group, a $C_8$-$C_{18}$ branched alkyl group, a $C_{11}$-$C_{18}$ linear alkyl group, such as the polymers of inventive Ex.8 and Ex.9, the copolymers with only one alkyl acrylate with a $C_6$-$C_{10}$ linear alkyl group, such as the inventive polymers Ex.3 and Ex.4, as well as the copolymer with only one alkyl acrylate with a $C_8$-$C_{18}$ branched alkyl group, such as inventive polymer Ex.12, show very low treat rates in 75W-90 formulations (F-9 and F-10, F-3 and F-4, as well as F-5, respectively).

A good high viscosity base fluid needs to combine several properties. An important criterion for high-performance gear oils is the low temperature performance. Aside from a low dependency of the viscosity on the temperature, which is also reflected in the VI, it is important that the polymers do not show strong intermolecular interactions, leading to poor low temperature performance.

Regarding the composition of the copolymers, acrylate-olefin copolymers with acrylate mixtures, combining short- and long-chain as well as branched acrylates, allow to tailor the solubility in the base oil and the low temperature properties (Ex. Table 2). Thereby, the requirements of the 75W-90 specification can be met (Table 4). As aforementioned, combinations of short chain olefins with high amounts of short-chain acrylates (Ex.2*-4*) tend to lead to insolubility in the base oil (Yubase 4) Thus, the defined ranges for the $C_4$ and $C_{11}$-$C_{18}$ alkyl acrylates according to the invention need to be met to ensure the fulfilment of the 75W-90 specification. For example, the copolymer with EA/EHA and hexene (Ex.6*) is oil soluble but was not able to fulfill the low temperature requirements of the 75W-90 formulation as shown in Table 5 (F-3*, BF-40=700,000 mPa-s). Furthermore, comparative Ex.7* demonstrate that an amount of an acrylate with $C_4$ linear alkyl group in the copolymer higher than 45% by weight, more specifically 46.9% by weight, lead to a copolymer which is oil soluble, but does not perform well at low temperature (F-4*. BF-40=178,000 mPa·s).

Comparative acrylate-olefin copolymers comprising high amounts of long chain linear acrylates ($C_{11}$-$C_{18}$ linear alkyl acrylate), such as lauryl acrylate, show poor low temperature properties as these copolymers are prone to crystallization (comparative Ex.5* and F-2*). Even in combination with short-chain or branched alkyl acrylates, the incorporation of more than 45% by weight of lauryl acrylate in the copolymer lead to extremely poor low temperature properties in the corresponding 75W-90 formulations. As shown in comparative formulations F-5* and F-6* in Table 5, the high content of long linear side chains having more than 8 carbon atoms in the acrylate monomer units result in extremely poor low temperature performance (solid at BF −40° C.) despite a high VI (>185). Thus, no good combination of high VI and good low temperature performance is achieved. Surprisingly, copolymers with lauryl acrylate contents according to the invention fulfill the requirements of a 75W-90 formulation (see for example inventive polymers Ex.5 to Ex.7 and corresponding formulations examples F-6 to F-8) which shows that the ranges of acrylates as described are essential to get a polymer with good properties.

The invention claimed is:
1. A copolymer, comprising:
    a) 70 to 95% by weight, based on a total weight of the copolymer, of monomer units derived from an acrylate of formula (I),

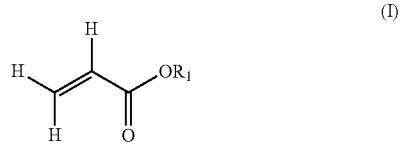

wherein $R_1$ means a linear or branched alkyl group having from 4 to 18 carbon atoms and is selected from the group consisting of a $C_4$ linear alkyl group, a $C_6$-$C_{10}$ linear alkyl group, a $C_8$-$C_{18}$ branched alkyl group, a $C_{11}$-$C_{18}$ linear alkyl group, and a mixture thereof, and wherein the monomer units derived from the acrylate of formula (I) comprises
    0 to 45% by weight of an acrylate of formula (I) wherein $R_1$ is a $C_4$ linear alkyl group;
    0 to 95% by weight of an acrylate of formula (I) wherein $R_1$ is a $C_6$-$C_{10}$ linear alkyl group;
    0 to 95% by weight of an acrylate of formula (I) wherein $R_1$ is a $C_8$-$C_{18}$ branched alkyl group;
    0 to 45% by weight of an acrylate of formula (I) wherein $R_1$ is a $C_{11}C_{18}$ linear alkyl group; or
    a mixture thereof, based on the total weight of the copolymer,
    b) 5 to 30% by weight, based on the total weight of the copolymer, of monomer units derived from at least one non-functionalized alpha-olefin of formula (II),

wherein $R_2$ means a linear alkyl group having from 2 to 4 carbon atoms, and wherein the copolymer has a weight-average molecular weight from 5,000 to 35,000 g/mol according to DIN 55672-1.

2. The copolymer according to claim 1, wherein the copolymer comprises from 75 to 95% by weight of monomer units a) derived from the acrylate of formula (I), based on the total weight of the copolymer.

3. The copolymer according to claim 1, wherein the copolymer comprises from 5 to 25% by weight of monomer units b) derived from the at least one non-functionalized alpha-olefin of formula (II), based on the total weight of the copolymer.

4. The copolymer according to claim 1, wherein the copolymer has a kinematic viscosity from 100 to 1,000 mm²/s at 100° C. according to ASTM D 445.

5. The copolymer according to claim 1, wherein the at least one non-functionalized alpha-olefin of formula (II) is selected from the group consisting of butene, hexene, and a mixture thereof.

6. The copolymer according to claim 1, wherein the amount of the acrylate of formula (I) wherein $R_1$ is a $C_4$ linear alkyl group is 0 to 40% by weight, based on the total weight of the copolymer.

7. The copolymer according to claim 1, wherein the acrylate of formula (I) is selected from the group consisting of butyl acrylate, n-octyl acrylate, 2-ethylhexyl acrylate, 2-propylheptyl acrylate, isononyl acrylate, lauryl acrylate, and a mixture thereof.

8. The copolymer according to claim 1, wherein the copolymer further comprises 0 to 20% by weight of monomer units derived from monomer c) selected from the group consisting of methacrylamides, fumarates, maleates, (meth)acrylates other than the acrylate of formula (I), and a mixture thereof, based on the total weight of the copolymer.

9. The copolymer according to claim 1, wherein the total amount of monomer units derived from monomers a) and b) in the copolymer sums up to 80% by weight or more, based on the total weight of the copolymer.

10. The copolymer according to claim 8, wherein the total amount of monomer units derived from monomers a), b), and c) in the copolymer sums up to 90% by weight or more, based on the total weight of the copolymer.

11. The copolymer according to claim 1, wherein the copolymer has a weight-average molecular weight from 7,000 to 25,000 g/mol, according to DIN 55672-1.

12. The copolymer according to claim 1, wherein the copolymer has a polydispersity index from 1.0 to 3.5.

13. A method for the preparation of the copolymer as defined in claim 1, the method comprising:
    i) providing a monomer composition, and
    ii) initiating radical polymerization in the monomer composition to obtain the copolymer.

14. A lubricant composition, comprising:
    one or more base oil, and
    at least one copolymer according to claim 1.

15. A method, comprising:
    adding the copolymer according to claim 1, as a lubricant additive or synthetic base fluid, to a lubricating oil composition.

16. The method according to claim 15, wherein the lubricating oil composition is a gear oil composition, a transmission oil composition, a hydraulic oil composition, an engine oil composition, a marine oil composition, an industrial lubricating oil composition, or grease.

17. The copolymer according to claim 4, wherein the copolymer has a kinematic viscosity from 100 to 500 mm²/s at 100° C. according to ASTM D 445.

18. The copolymer according to claim 8, wherein the copolymer comprises 0 to 10% by weight of the monomer units derived from monomer c), based on the total weight of the copolymer.

19. The copolymer according to claim 9, wherein the total amount of monomer units derived from monomers a) and b) in the copolymer sums up to 90% by weight or more, based on the total weight of the copolymer.

20. The copolymer according to claim 10, wherein the total amount of monomer units derived from monomers a), b), and c) in the copolymer sums up to 100% by weight, based on the total weight of the copolymer.

21. A method according to claim 13, wherein a total amount of radical initiator used relative to the total weight of the monomer composition is 0.01 to 1% by weight.

22. The lubricant composition of claim 14, comprising 1 to 95% of the at least one base oil and 5 to 99% by weight of the at least one copolymer.

* * * * *